United States Patent
Sole

(10) Patent No.: US 8,781,397 B2
(45) Date of Patent: Jul. 15, 2014

(54) SYSTEM AND METHOD FOR INITIATING A SECURE COMMUNICATION LINK BASED ON PROXIMITY AND FUNCTIONALITY OF WIRELESS COMMUNICATION DEVICES

(75) Inventor: Jon Sole, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 196 days.

(21) Appl. No.: 12/780,878

(22) Filed: May 15, 2010

(65) Prior Publication Data
US 2012/0015605 A1   Jan. 19, 2012

(30) Foreign Application Priority Data
May 15, 2009 (GB) .................... 0908406.2

(51) Int. Cl.
  H04B 7/00 (2006.01)
  H03C 1/62 (2006.01)
  H04B 17/02 (2006.01)
  H04B 17/00 (2006.01)
(52) U.S. Cl.
  USPC ..... 455/41.2; 455/115.3; 455/134; 455/226.2
(58) Field of Classification Search
  USPC ................................. 455/41.2, 41.3
  See application file for complete search history.

(56) References Cited

U.S. PATENT DOCUMENTS

| | | |
|---|---|---|
| 2002/0115426 A1 | 8/2002 | Olson et al. |
| 2003/0050009 A1 | 3/2003 | Kurisko et al. |
| 2003/0199267 A1 | 10/2003 | Iwasa et al. |
| 2004/0203357 A1 | 10/2004 | Nassimi |
| 2005/0136845 A1* | 6/2005 | Masuoka et al. ........... 455/67.14 |
| 2006/0056636 A1 | 3/2006 | Schrum, Jr. |
| 2006/0072013 A1* | 4/2006 | Renkis .......... 348/156 |
| 2006/0114499 A1* | 6/2006 | Sumita et al. ........ 358/1.15 |
| 2006/0143455 A1 | 6/2006 | Gitzinger |
| 2007/0129116 A1* | 6/2007 | Katoh et al. ......... 455/569.1 |
| 2007/0160225 A1* | 7/2007 | Seydoux ............. 381/79 |
| 2008/0009309 A1* | 1/2008 | Gha ............. 455/550.1 |
| 2008/0013601 A1* | 1/2008 | Lind et al. ........ 375/140 |
| 2008/0039136 A1 | 2/2008 | Byun |
| 2008/0063030 A1* | 3/2008 | Jeong ............ 375/134 |
| 2008/0242220 A1* | 10/2008 | Wilson et al. ......... 455/3.04 |
| 2008/0268776 A1 | 10/2008 | Amendola |
| 2009/0061769 A1* | 3/2009 | Zimbric et al. ........ 455/41.2 |
| 2009/0143012 A1* | 6/2009 | Jeon ............ 455/41.2 |
| 2009/0156126 A1* | 6/2009 | Willis ............. 455/41.3 |
| 2010/0255787 A1* | 10/2010 | Wilson et al. ........ 455/67.11 |
| 2012/0115464 A1* | 5/2012 | Jang ............ 455/426.1 |

FOREIGN PATENT DOCUMENTS

| | | |
|---|---|---|
| EP | 1701566 A | 9/2006 |
| EP | 1701567 A | 9/2006 |
| GB | 2342010 A | 3/2000 |
| WO | 2006/100384 A | 9/2006 |

\* cited by examiner

Primary Examiner — Temesgh Ghebretinsae
Assistant Examiner — Devan Sandiford
(74) Attorney, Agent, or Firm — Vorys, Sater, Seymour and Pease LLP; Vincent M DeLuca

(57) ABSTRACT

A method for initiating a security relationship by a first communication device, wherein the first device communicates with a number of other communication devices, selects, in dependence on the result of the communicating step, one of the other devices, and initiates the negotiation of a security relationship with that selected device.

14 Claims, 3 Drawing Sheets

000
SYSTEM AND METHOD FOR INITIATING A SECURE COMMUNICATION LINK BASED ON PROXIMITY AND FUNCTIONALITY OF WIRELESS COMMUNICATION DEVICES

BACKGROUND OF THE INVENTION

This invention relates to secure communication between devices. It is especially, but not exclusively, relevant to pairing Bluetooth devices.

Many devices are capable of communicating with other devices. For reasons of security, it is often desirable to restrict the devices from which one device will accept at least some types of communication. Many wired and wireless communication protocols incorporate security protocols that serve this purpose. In order to be effective, many of these security protocols must require a user or an operator to take some action to enable communications between a pair of devices. This can be inconvenient when at least one of the devices has a restricted user interface.

In the Bluetooth protocol one type of security configuration is achieved by means of a process known as pairing. The pairing process in Bluetooth can be performed in a number of ways. The most common way is as follows:
1. One device (device A) is configured so that it can transmit signals in such a way as to be discovered by the other device (device B).
2. The user instructs device B so as to discover any nearby devices.
3. The user views on the display of device B a list of the devices that device B has discovered. The user selects device A from the list and instructs device B to initiate pairing with device A.
4. Device B transmits a series of messages to device A to initiate pairing.
5. The user must share a security code between devices A and B. The user may enter the code into both devices, if they both have keypads. Alternatively, one or of the devices may be pre-configured with a security code (e.g. 0000), which the user can enter into the other device. Conceivably both devices could be reprogrammed with matching security codes, but that would not greatly enhance security.
6. If the security codes in both devices match then the pairing process continues. Each device stores information about the other that enables them to communicate in future.

Further details of the Bluetooth pairing processes are available from the Bluetooth Core Specifications "2.0+EDR" and "2.1+EDR".

Some devices have limited user interfaces. Examples of such devices are Bluetooth-equipped headsets, Bluetooth-equipped data loggers and Bluetooth-equipped sensor devices. Such devices might have few if any user-operable buttons, or a limited display if they have any display at all. The limited user interfaces that these devices have make it difficult to use them to initiate pairing.

One reason for this is that it is difficult to perform step 3 above since the devices cannot easily display a list of devices they have discovered, and do not allow a discovered device to be easily selected by the user. Because of this it is conventional to initiate pairing using whichever device it is desired to pair with the device that has the limited interface. That device will typically have a more sophisticated user interface. It might, for example, be a computer or a mobile phone.

However, this has other problems because many users find it difficult to navigate the menus needed to control the device to initiate pairing. When the device is in its default state it is not initiating pairing, and so in order to initiate pairing the user must typically navigate the device's menu system to find the right option. Many devices that have been bought are returned to retailers not because they are faulty but because users are unable to get them to pair with another device.

Pairing processes that use other out-of-band mechanisms such as near-field communications (NFC) have been proposed, but these need additional hardware for communication over the out-of-band channel.

Newer Bluetooth devices support simplified pairing algorithms such as secure simple pairing. However, it is nevertheless desirable for new devices to be able to communicate with legacy devices that do not support new pairing algorithms.

These problems are not limited to Bluetooth. Similar issues exist in Wi-Fi (802.11) and other protocols, when two devices are to be configured to communicate with each other. There is therefore a need for an improved pairing mechanism.

SUMMARY OF THE INVENTION

According to the present invention there is provided a method and a device as set out in the accompanying claims, which satisfies the need for improvements in device pairing mechanisms. In accordance with one aspect of the invention, there is provided a method for initiating a security relationship by means of a first communication device, wherein the first communication device communicates with a plurality of other communication devices; selects, in dependence on the result of the communicating step, one of the other devices; and initiates the negotiation of a security relationship with that selected device.

In accordance with another aspect of the invention, a communication device is provided having a transceiver and being capable of communicating in accordance with a protocol by means of that transceiver at power levels up to and including a maximum power level, the communication device being configured for initiating a security relationship by transmitting at a power lower than the maximum power level a message for eliciting responses from other communication devices; and initiating the negotiation of a security relationship with a device that responds to the message.

BRIEF DESCRIPTION OF THE DRAWINGS

The present invention will now be described by way of example with reference to the accompanying drawings. In the drawings.

DETAILED DESCRIPTION OF THE INVENTION

In the examples to be described below, pairing is initiated by a device having a relatively sparse user interface: in this example a headset. The headset attempts to discover the closest Bluetooth device to it that supports the features that the headset is required to use: in this example a mobile phone. The headset then automatically initiates pairing with that device. In this mechanism the headset is inquiring as master; whereas typically when a headset is to pair with another device, that other device inquires as master. (The terms "master" and "slave" are used here in accordance with section 2.5 of the Bluetooth 2.1+EDR specification).

The headset can perform the operations described above when it is turned on. Then, if the headset is turned on when it is next to a phone that is discoverable the initiation of pairing will be essentially automatic.

In the examples to be described below, the device initiating pairing is a headset. However the invention is not limited to use with headsets. It is especially advantageous when used with devices that have a restricted user interface: for instance no display, or at least no display that can indicate characters and/or no keypad, or at least a keypad of few buttons (e.g. fewer than four buttons). Such devices could include data loggers, dongles, watches and so on. However, the same mechanisms as described below could be used by devices that have a more capable user interface, for instance mobile phones, personal computers, domestic appliances and cars. As noted above, in examples of the method pairing between two devices can be initiated by the device having the more limited user interface; in other words that device acts as the master for the purposes of pairing.

Figure 1:
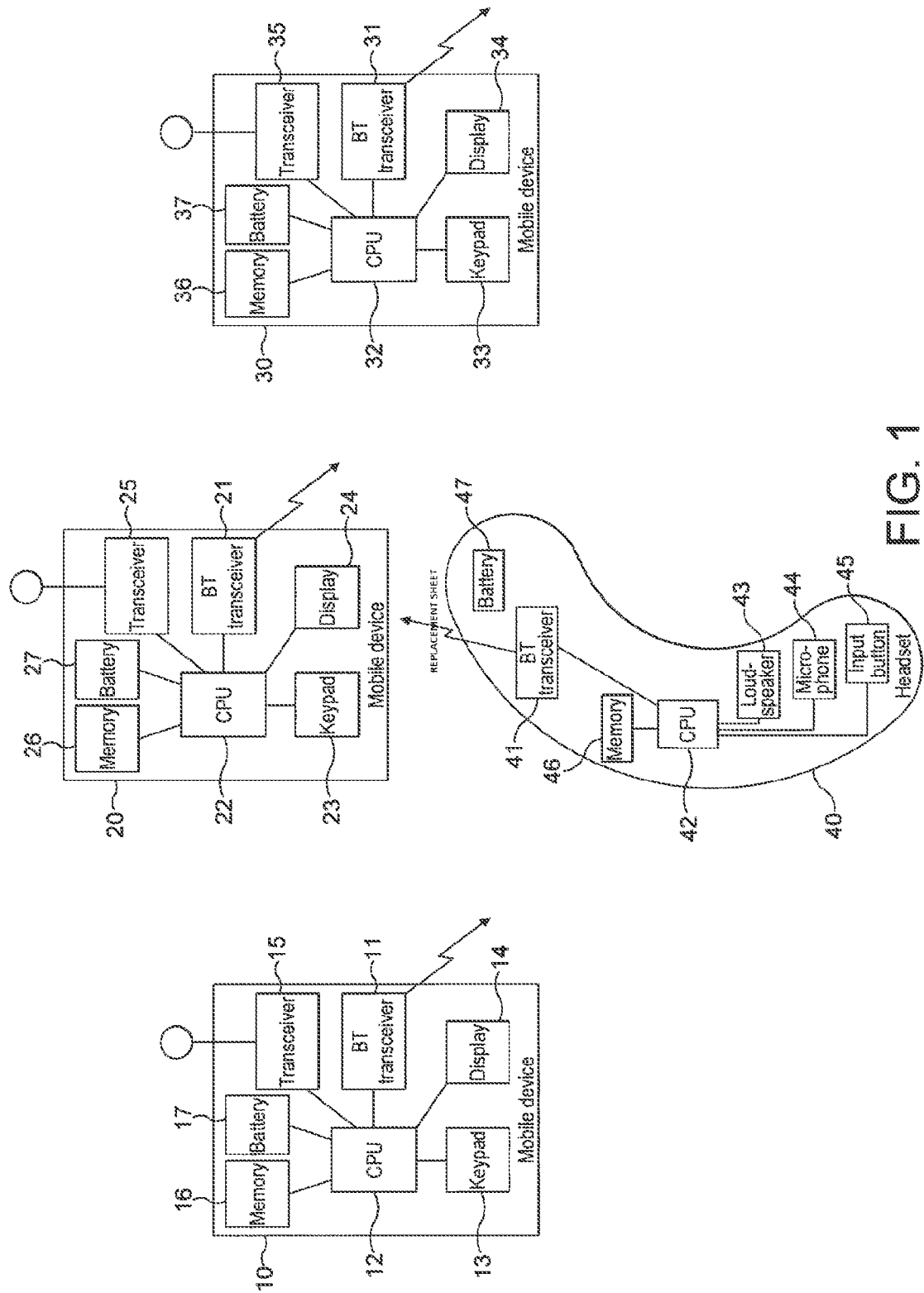
FIG. 1 illustrates a communications environment in which there are multiple Bluetooth-equipped devices.

FIG. 1 illustrates a communication environment in which a number of devices are within range of each other. The devices include mobile phones 10, 20, 30 and a headset 40. Each of the devices has a Bluetooth communications transceiver 11, 21, 31, 41 by means of which it can communicate wirelessly with other devices that are equipped with Bluetooth.

Each mobile phone comprises a central processing unit (CPU) 12, 22, 32, which is connected to the respective Bluetooth transceiver. Each mobile phone also comprises a keypad 13, 23, 33, a display 14, 24, 34 and a transceiver 15, 25, 35 for a mobile phone protocol, each of which is connected to the respective CPU. In operation the CPU executes instructions held in a non-volatile memory 16, 26, 36 to control the operation of the mobile phone. The CPU can accept instructions from a user via the keypad and can provide output by means of the display. The CPU can communicate by Bluetooth using the phone's Bluetooth transceiver and by the mobile phone protocol using the mobile phone transceiver 15, 25, 35. Each phone is powered by a battery 17, 27, 37.

The headset comprises a CPU 42, which is connected to the Bluetooth transceiver of the headset. The headset also comprises a loudspeaker 43, a microphone 44 and a single user input button 45, all of which are connected to the CPU. In operation the CPU executes instructions held in a non-volatile memory 46 to control the operation of the headset. The CPU can provide audio output via the loudspeaker and can accept audio input from the microphone and button push input from the button 45.

The CPU can communicate by Bluetooth using the Bluetooth transceiver 41. The headset is powered by a battery 47. In practice, the CPU, Bluetooth transceiver and memory could be integrated on a single integrated circuit.

The headset and the mobile phones are capable of interoperating so that when the headset and one of the phones are suitably configured the headset can be used to handle audio for the call. In this mode audio data that the phone receives by means of its mobile phone transceiver is transmitted to the headset by Bluetooth. The headset receives the audio data and plays it out by means of its loudspeaker. The headset picks up audio by means of its microphone, and transmits the resulting audio data to phone by Bluetooth. That audio data is then forwarded towards the other party on the call by means of the phone's mobile phone transceiver. In this way the headset can function as a wireless headset. The headset may have the capability to perform additional audio processing, for example echo reduction, noise reduction and correction for data loss or errors.

The CPU 42 of the headset can control the Bluetooth transceiver 41 to operate in a manner defined by the program code that the CPU 42 executes, and that is stored in memory 46. In this way the CPU can control the pairing functions of the Bluetooth transceiver. The headset may be able to pair with other devices in various ways. However, in one mode of operation it can pair by (a) scanning with the aim of identifying the nearest discoverable Bluetooth device and then (b) attempting to pair with that device. In this mode of operation it is the headset that initiates pairing with the other device. Thus the headset acts as the master for the pairing operation and the other device acts as the slave for the pairing operation. This has a number of advantages.

First, because the headset automatically selects which device to attempt to pair with, there is no need for the user to operate a user interface of the headset to select which device to attempt to pair with. This overcomes the limitations in that regard of the headset's restricted user interface.

Second, the user interface of the device that the headset is attempting to pair with is available to allow the user to perform the other part of the pairing process. Devices can be configured to automatically await the receipt of signals indicating an attempt to pair with them, and in response to those signals alert the user to the attempt and provide instructions on how to accept or reject the attempt. This means that when a device with a more capable user interface is the slave for the pairing process the acceptance of the pairing request can be straightforward for a user to manage.

Third, as will be described in more detail below, the headset can begin the pairing process automatically. This means that the user does not even need to tell the headset to start the pairing process. In one embodiment, the headset performs the following steps in the pairing operation:

1. Determine that pairing is to be performed. This determination may be dependent on automatic detection of one or more pre-defined conditions and/or in response to intervention by the user and/or other factors.

2. Establish one device with which to attempt pairing. If there is more than one candidate device in range with which pairing can be attempted then the candidate devices can be narrowed down to one device by one or more techniques including but not limited to: (a) a ranging algorithm directed at finding the closest of the candidate devices and eliminating other candidate devices; (b) eliminating one or more candidate devices based on information about their device type and/or capabilities (e.g. Bluetooth profile); (c) eliminating candidate devices based on historical information stored by the headset, for example eliminating devices with which the headset has previously tried but failed to pair. Any ranging algorithm may be a true mechanism for identifying the range of each device, or it may be an approximate method based on, for example, received signal strength.

3. Attempt pairing with the selected device.

It should be noted that a number of mechanisms are available for restricting the search to nearby or closest devices. In one mechanism, when the devices are making use of a protocol in which devices are configured to transmit signals in response to an inquiry signal then the power of the inquiry signal could be restricted to a low level. That level could be less than 50%, less than 20% or less than 10% of the maximum power with which the inquiring device could transmit such a signal. In another mechanism, devices can be identified and then the range to those devices can be estimated, and the search can be limited to those devices determined to be closest. In another mechanism, a database of devices' locations could be maintained and could be accessed to establish which device is the closest.

When the devices with which pairing can be established are to be filtered based on capability as well as distance, either type of filtering can be performed first. Alternatively, the protocol that is in use may support filtering based on capability by specifying that an inquiry message can indicate the capability sought by the inquiring device, and that only devices having that capability should respond to such an inquiry message.

Figure 2:
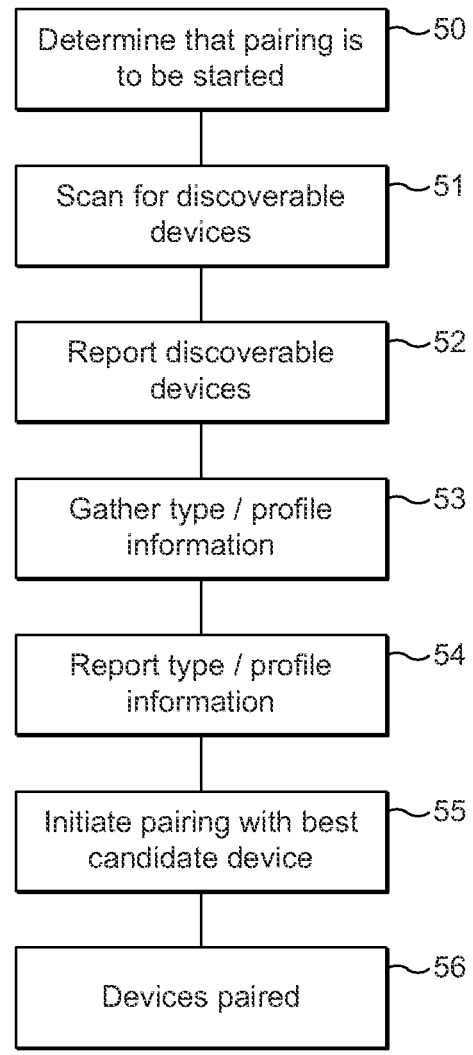
FIG. 2 shows the steps in a process for performing pairing.

The steps involved in one example of a method of pairing are illustrated in FIG. 2. In step 50, the CPU 42 determines that the pairing process is to be started. The CPU may determine this in a number of ways. It may, for example, start the pairing process in response to any one or more of the following states being detected:

1. The headset has just been powered up and is not paired with any device (or with any device of a specific type).
2. A pre-defined period has elapsed since the last iteration of the pairing process and the headset is not paired with any device (or with any device of a specific type).
3. The user has performed a reset of the headset.
4. The user has provided an input of a pre-defined type to the headset's user interface; for example holding down the button 45 for 3 seconds.

In step 51 the CPU 42 causes the Bluetooth transceiver 41 to scan for discoverable Bluetooth devices. In general, the Bluetooth discovery process involves the discovering device broadcasting one or more inquiry messages, and discoverable devices responding to those messages. In this example, the scan may be performed in either of two ways. One way is for the headset to scan for all discoverable devices that are in range of it. Those candidate devices may then be narrowed down later on based, for example, on factors such as device class and range.

Another way is for the headset to limit the power used for the discovery process, so as to have the effect of limiting the devices that might be expected to be discovered to those that might be expected to be the nearest to the headset. (Of course, received signal strength is only an approximate indicator of range). One way to limit the devices that would be expected to be revealed by the discovery process is to limit the power that the headset uses to transmit the inquiry message(s) to a level that is below the headset's maximum Bluetooth transmit power level and more preferably below the level with which it would normally transmit such inquiry messages. Most preferably it transmits the inquiry message(s) at or close to its minimum Bluetooth transmit power (at least initially). That may, for example, be −70 dBm or less, −60 dBm or less, −50 dBm or less, −40 dBm or less, −30 dBm or less or −20 dBm or less. If no devices respond to one or more inquiry messages at that power level then the Bluetooth transceiver of the headset may transmit another inquiry message or set of inquiry messages at a higher power level, repeating that process until it reaches its maximum transmit power level or until a device responds.

In this way, the headset will stop attempting to discover devices once it has discovered the device or devices that can best receive from it. To a rough approximation these can be expected to be the closest devices to it, but of course the precise characteristics of the communication environment may mean that devices that are further away are discoverable at a lower power level.

In step 52 the Bluetooth transceiver 41 reports the or each discovered device to the CPU 42. If more than one device has been discovered then the CPU may cause the Bluetooth transceiver to gather more information about the discovered devices (step 53) and report that information to the CPU (step 54) so that the CPU can decide which one of those devices the headset is to initiate pairing with. In a practical embodiment the Bluetooth transceiver may have gathered some or all of that information during the discovery/inquiry process, but for ease of explanation it will be supposed that it does so in a second step. The information-gathering steps that the CPU may instruct the Bluetooth transceiver to perform can include the following:

1. Gathering the received signal strength (RSS) of signals from the respective discovered device. This may be gathered by the Bluetooth transceiver transmitting an inquiry message and measuring the signal strength of the inquiry response packet. Most Bluetooth transmissions are subject to power control, so received signal strength is not representative of distance, but inquiry responses are transmitted at a fixed transmit power. In a Bluetooth transceiver, the gathering of this RSS information this may be accomplished by using inquiry with RSSI mode.

More generally, preferably the headset measures the RSS of a message from the respective discovered device that is limited by the protocol in question to be transmitted at a pre-set power, or that is transmitted at a power that is otherwise known to the headset (for instance because the respective device has reported the transmit power to the headset). If the RSS measurement is performed multiple times for each device then it will be expected to return different results each time. In this case, preferably the highest measured RSS among the measurements in respect of a particular candidate device is used as a representative RSS for that device.

2. Gathering the type (e.g. class as indicated by the Bluetooth class_of_device parameter) or capabilities of the respective discovered device. If the class of device with which it is desired to pair the headset is known then instead of gathering the type of all the discovered devices, the headset can perform an inquiry scan using class of device filtering. This will return responses from only the devices of the desired class. In Bluetooth and other protocols there may be additional ways of indicating devices' capabilities: for example by indicating compliance with a particular profile or with a particular version of a standard.

The Bluetooth transceiver then reports the information it has gathered on the candidate devices to the CPU. Using this information the CPU may be able to identify a single device that is suitable for attempting to pair with. That is preferably the closest discovered device and/or a discovered device of a specific type/capability. It is possible that no devices meet the criteria, in which case the process is repeated, using an increased transmit power if transmit power was restricted during the previous iteration. It is possible that multiple eligible devices are indistinguishable in distance (e.g. the difference in RSSI between those devices is less than a threshold such as 10 dB). In that case the CPU could select whichever has the greater RSSI, but more preferably it does not attempt to pair with either. In that situation the CPU could cause the headset to indicate an error condition to a user, for instance by emitting a beep or by flashing an LED rapidly. The user could then re-position his devices so that the process will succeed next time.

If the CPU can identify a single device with which to pair then in step 53 of FIG. 2 it initiates pairing with that device. If the other device has a display and a keypad then it will typically be relatively easy for the user to perform the actions required to complete the pairing process from that other device. Many such devices automatically present an alert on the display when they receive a pairing attempt, asking the user if they want to accept the pairing request and inviting the user to enter a code to allow the pairing to take place. Since the device provides prompts to the user in that way, it is considerably easier to complete that end of the pairing operation on a device that has a display and a keypad than to complete it on a device such as a typical headset that does not have those features. The user enters the necessary information, for example by accepting the pairing request and/or entering a code that matches the one in use by the headset. The pairing process then proceeds in accordance with the Bluetooth specification and the devices are paired. (Step 56).

Figure 3:
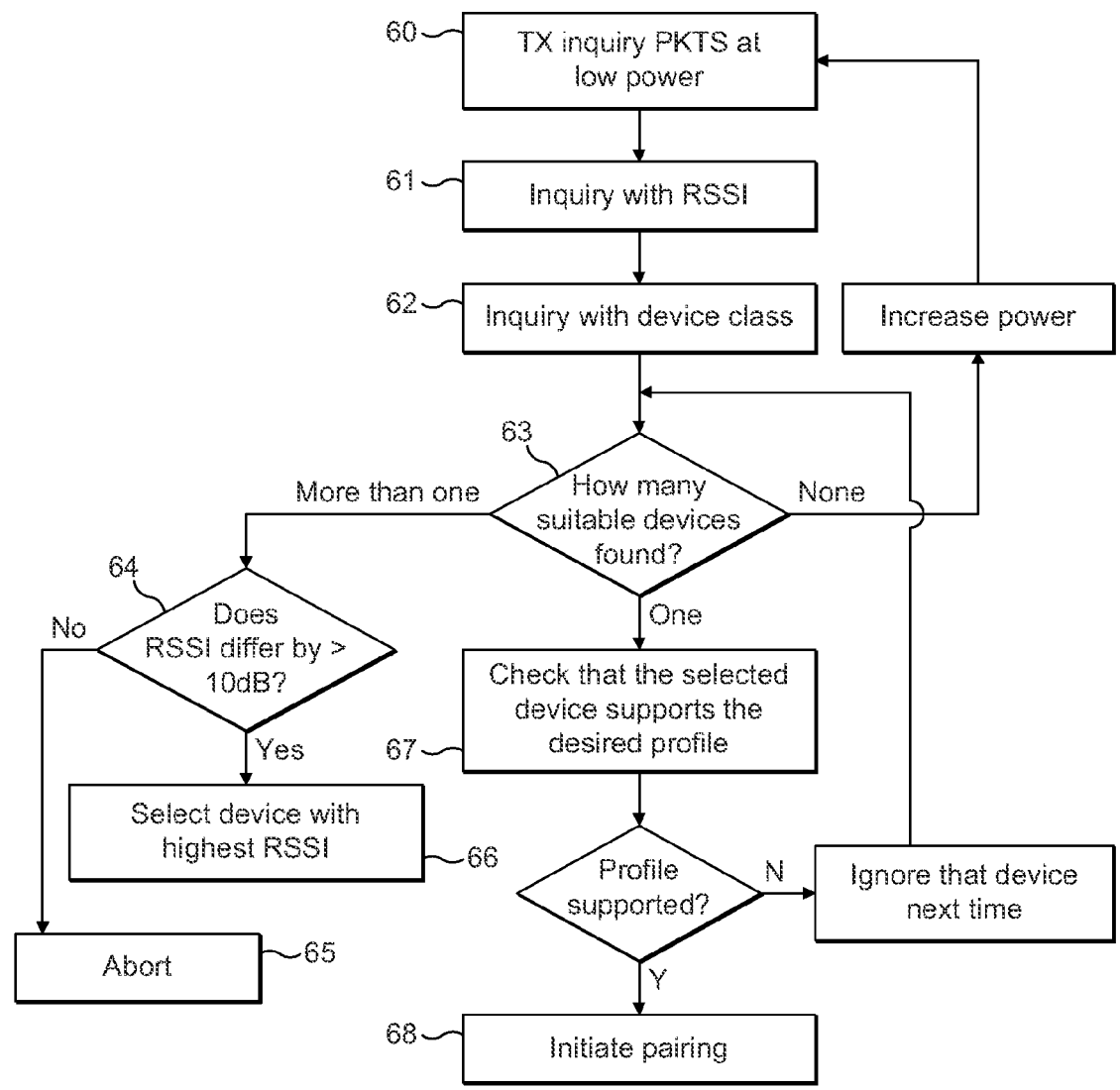
FIG. 3 shows the steps in a process for identifying a single device with which to initiate pairing.

The headset may proceed in a variety of ways to identify a single device with which to initiate pairing. Which of those ways is more efficient will depend on factors such as the expected communication environment, the capabilities of the headset's Bluetooth transceiver and the energy available to the headset. In more detail, one convenient method, which is illustrated in FIG. 3, is as follows:

1. The headset configures itself so that future inquiry packets will be transmitted at the lowest power it can achieve, e.g. −70 dB under the Bluetooth 2.1 standard. (Step 60).

2. The headset configures itself so that it will gather RSSI data during the inquiry process. This may be known as "inquiry with RSSI" mode. When operating in this mode it will measure and collect data on the RSSI of signals from discovered devices. This will be used later to roughly estimate the distance to discovered devices since inquiry response are sent with a fixed transmit power. (Step 61).

3. The headset performs the inquiry process in accordance with the previous configuration and with a filter applied so that it will filter inquiry responses so as to ignore responses from devices that do not have a specified class or classes. This may be known as "inquiry with required class of device filtering". This inquiry will return multiple results for every device of the pre-set class or classes. The headset takes the highest measured RSSI result for any one device as being representative of RSSI for that device, and records the Bluetooth addresses of the two devices having the highest RSSI. (Step 62).

4. Once inquiry has completed, check how many devices were found. (Step 63). If only one then go to step 5. If no devices found then the headset configures itself so that future inquiry packets will be transmitted a slightly higher power than before, and then returns to step 3. Otherwise check the difference between the two measured RSSI values for the devices selected in step 3. (Step 64). If the difference is less than 10 dB then abort the pairing (step 65) since the two devices found during inquiry are too close to each other, making it ambiguous which device should be paired with. If the difference is greater than 10 dB then take the Bluetooth address of the device with the highest RSSI, this is the device that might be paired with. (Step 66).

5. The Bluetooth address of the device identified in step 4 as having an unambiguously highest RSSI is taken as being the candidate device with which paring might be attempted. The headset does an SDP search to determine if that candidate device supports the Bluetooth profile(s) that the headset wants to make use of. (Step 67). Note that the step of filtering on class of device filter at stage 4 may have filtered out many types of device that do not support the desired profile. Under the Bluetooth standard an SDP search can be done without a secure link having been established, so it can be done before pairing takes place.

6. If the SDP search results indicate that the candidate device supports the required profile(s) then the headset begins pairing with that device. (Step 68). This can be done by attempting an HFP or A2DP connection, or by initiating pairing directly. If the SDP search results indicate that the candidate device does not support the required profile(s) then the process can be aborted, or the step of performing an SDP search can be repeated for the next-nearest device that meets the device class filter.

7. When pairing is achieved, the headset stores the details of the pairing in nonvolatile memory. This allows it to initiate secure communications with the other device in the future. It also allows the headset to detect, when it is next turned on, that it has been paired with a device so it does not need to repeat the proximity pairing process described above. More data could be collected at step 4. For example, the addresses of more than two devices, together with their RSSI values could be retained to reduce the iterations of the process. Average RSSI could be recorded as well as or instead of peak RSSI; this would allow better analysis to determine which device is 'closest'. A true distance measuring algorithm could be used, for example as described in EP 1 595 160. The device with which the headset pairs is preferably a mobile phone or a music player. Preferably it supports the headset profile (HSP) and or the hands-free profile (HFP).

To illustrate the operation of devices in accordance with one example, a user might want to pair a mobile phone with a headset. The mobile phone has a keypad and a display; and the headset has a more restricted user interface, having no display and only one button, whose function varies depending on context. The mobile phone is set, either by default or by the user, to be discoverable and to display messages to the user when a pairing request is received so as to help the user to accomplish the pairing process. The headset is unused and has no pairing relationships stored.

The user holds the headset and the phone next to each other and turns the headset on. The headset automatically detects that it is not paired with any other device, and starts the process described above. It detects that the phone is the nearest device to it and then initiates pairing with it in the way described above.

As indicated above, measurement of RSSI gives only a rough indication of distance. When multiple discoverable devices are in range, the headset may determine which is the nearest by using a metric that gives a measure that is representative of the proximity of the device. That may, for instance, be a ranging metric (for example involving the measurement of timing differences over one link or by trilateration) or may be a metric that is dependent on received signal strength (as described above), receive quality at a set transmit power, or the transmit signal strength required to achieve a set receive quality.

It may be desired to further reduce the transmit power of the headset so as further reduce the number of devices that might respond to its inquiry messages. This could be done by switching an attenuator into the headset's Bluetooth transmit chain during the inquiry process.

The principles described above can be applied to initiating secure connections in protocols other than Bluetooth. They could be applied to any protocol in which devices exchange data to establish a secure (e.g. encrypted and/or authenticated) relationship between each other, and the term "paring" as used herein should be understood accordingly. Examples of such other protocols include Wi-Fi. The pairing operation that is performed could involve any suitable exchange of data to establish a security relationship. In Bluetooth it could be pairing as defined in versions of the standard prior to version 2.1 or secure simple pairing as defined in version 2.1 of the standard.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for initiating a security relationship at a first communication device having a restricted user interface, the method comprising performing the following steps at the first device:
   transmitting to other communication devices;
   receiving communications from a plurality of the other communication devices;
   determining a received signal strength indicator (RSSI) for each of the plurality of other communication devices;
   selecting, without user input and in dependence on the result of the said receiving step, one of the other devices;
   determining a difference between received signal strength indicators of the selected device and least one other communication device;
   determining whether the selected device supports a profile as required by the first communication device, and, if the required profile is supported and only if the difference is greater than a predetermined threshold:
   initiating the negotiation of a security relationship with that selected device, wherein a connection is not made to either device if the difference in the RSSI is less than the predetermined threshold.

2. A method as claimed in claim 1, wherein:
   the said receiving step comprises estimating the distance between the first communication device and each of the other communication devices; and
   the selecting step comprises selecting the one of the other communication devices that is closest to the first communication device.

3. A method as claimed in claim 1, wherein:
   the said receiving step comprises determining whether each of the other communication devices supports a predetermined function; and
   the selecting step comprises selecting one of the other communication devices that supports the predetermined function.

4. A method as claimed in claim 3, wherein:
   the said receiving step comprises estimating the distance between the first communication device and at least some of the other communication devices; and
   the selecting step comprises selecting the closest one of the other communication devices to the first communication device that also supports the predetermined function.

5. A method for initiating a security relationship at a first communication device having a restricted user interface and a transceiver and being capable of communicating in accordance with a protocol using that transceiver at power levels up to and including a maximum power level, the method comprising performing the following steps at the first device:
   transmitting at a power lower than the maximum power level a message for eliciting responses from other communication devices;
   receiving responses to said message from a plurality of the other communication devices;
   determining a received signal strength indicator (RSSI) for each of the plurality of other communication devices;
   selecting, without user input, a device that responds to the said message determining whether the selected device supports a profile as required by the first communication device;
   determining a difference between received signal strength indicators of said selected device and least one other communication device; and, if the required profile is supported and only if the difference is greater than a predetermined threshold:
   initiating the negotiation of a security relationship with the selected device, wherein a connection is not made to either device if the difference in the RSSI is less than the predetermined threshold.

6. A method as claimed in claim 5, wherein the said power lower than the maximum power level is the minimum power with which the first communication device can transmit the said message.

7. A method as claimed in claim 5, wherein the said message is an inquiry message.

8. A method as claimed in claim 5, wherein the message is a message that is defined by the protocol as being suitable for eliciting responses from other communication devices.

9. A method as claimed in claim 5, wherein the first communication device has no display.

10. A method as claimed in claim 5, wherein the first communication device is a headset.

11. A method for initiating pairing at a first Bluetooth device having a restricted user interface, the method comprising performing the following steps at the first Bluetooth device:
    transmitting a Bluetooth inquiry message to other Bluetooth devices;
    receiving communications from a plurality of the other Bluetooth devices;
    determining a received signal strength indicator (RSSI) for each of the plurality of other communication devices;
    using the received communications to identify the closest discoverable Bluetooth device to the first Bluetooth device that is capable of supporting a predetermined Bluetooth profile as required by the first Bluetooth device;
    determining a difference between received signal strength indicators of said identified closest discoverable Bluetooth device and at least one other communication device;
    selecting, without user input, the identified Bluetooth device only if the difference is greater than a predetermined threshold; and
    automatically initiating pairing between the first Bluetooth device and the identified Bluetooth device with the first Bluetooth device as master, wherein a connection is not made to either device if the difference in RSSI is less than the predetermined threshold.

12. A communication device having a restricted user interface configured for initiating a security relationship by the steps of:
    transmitting to other communication devices;
    receiving communications from a plurality of the other communication devices;
    determining a received signal strength indicator (RSSI) for each of the plurality of other communication devices;
    selecting, without user input and in dependence on the result of the said receiving step, one of the other devices;

determining a difference between received signal strength indicators of said selected device and least one other communication device;

determining whether the selected device supports a profile as required by the communication device, and, if the required profile is supported and only if the difference is greater than a predetermined threshold:

initiating the negotiation of a security relationship with that selected device, wherein a connection is not made to either device if the difference in the RSSI is less than the predetermined threshold.

13. A communication device having a restricted user interface and a transceiver and being capable of communicating in accordance with a protocol using that transceiver at power levels up to and including a maximum power level, the communication device being configured for initiating a security relationship using the following steps:

transmitting at a power lower than the maximum power level a message for eliciting responses from other communication devices;

receiving responses to said message from a plurality of the other communication devices;

determining a received signal strength indicator (RSSI) for each of the plurality of other communication devices;

selecting, without user input, a device that responds to the said message;

determining a difference between received signal strength indicators of said selected device and least one other communication device;

determining whether the selected device supports a profile as required by the communication device, and, if the required profile is supported and only if the difference is greater than a predetermined threshold:

initiating the negotiation of a security relationship with the selected device, wherein a connection is not made to either device if the difference in the RSSI is less than the predetermined threshold.

14. A Bluetooth communication device having a restricted user interface and being configured for initiating pairing, the device being configured to perform the steps of:

transmitting a Bluetooth inquiry message to other Bluetooth devices;

receiving communications from a plurality of the other Bluetooth devices;

determining a received signal strength indicator (RSSI) for each of the plurality of other communication devices;

using the received communications to identify the closest discoverable Bluetooth device to the first Bluetooth device that is capable of supporting a predetermined Bluetooth profile as required by the Bluetooth communication device;

determining a difference between received signal strength indicators of said identified Bluetooth device and at least one other communication device;

selecting, without user input, the identified Bluetooth device only if the difference is greater than a predetermined threshold; and automatically initiating pairing with the identified Bluetooth device by acting as master in the pairing transaction, wherein a connection is not made to either device if the difference in the RSSI is less than the predetermined threshold.

* * * * *